United States Patent Office 2,984,635
Patented May 16, 1961

---

2,984,635

COMPOSITION COMPRISING ALUMINA PARTICLES COATED WITH POLYMER OF ETHYLENICALLY UNSATURATED MONOMER

Darrel M. Harris, Dayton, Ohio, assignor to Monsanto Chemical Company, St. Louis, Mo., a corporation of Delaware No Drawing. Filed June 3, 1957, Ser. No. 663,012

12 Claims. (Cl. 260—29.6)

---

This invention relates to new compositions of matter and the manner of producing them. The invention specifically relates to a composition of coated particles of a laminar form of alumina. It is an object of the invention to provide a composition of matter which may be applied to combustible material in order to provide a flameproof coating upon normally combustible materials. It is a further object of the invention to provide coated particles of laminar alumina as a water dispersible paint, particularly for use in applications where a temporary coating is intended to be readily removed after it has served its purpose.

In accordance with the terminology which has developed in this field "flameproofing" means the treatment of a material so that it is resistant to the propagation of flame across its surface after the igniting flame has been removed; i.e., a properly flameproofed material will not support combustion independently of an external source of heat. In contact with an open flame, however, or at elevated temperature flameproofed organic materials can be expected to char and decompose. The technical term "flameproofing" is used herein according to the definitions and requirements set forth in the ASTM Standards 1944 Yearbook under Test (D626–41T) BS III, 1930, and also the Army Quartermaster Corps Test JQD 242.

The laminar form of alumina which is employed in the present invention is composed of leaf or flake shaped particles having dimensions in the range of from 0.005 to 0.10 micron average thickness, while the average length and width of the flake has been found to vary within the range of from 1 to 10 microns. This laminar form of alumina is prepared by a vapor phase oxidation method utilizing solutions of aluminum salts as is described in co-pending application Serial No. 631,444, filed December 31, 1956.

It has now been found that the fire proofing and heat insulating compositions may be produced from aqueous dispersions containing finely divided particles of alumina which are coated with a polyelectrolyte.

Useful dispersing agents are the water-soluble polymeric polyelectrolytes, especially those having a weight average molecular weight of at least 10,000, and which contain substantially linear continuous carbon chains derived by the polymerization of an aliphatic unsaturated carbon to carbon double bond. The expression "water-soluble" is intended to include compounds which form true solutions in either distilled water or in alumina dispersions in water, and also those which swell and become dispersed in aqueous media. The expression, "substantially linear" defines a normal polymer structure as prepared by the polymerization of a mono-olefinic monomer and possessing a minimum of cross-linking structures, which tend to render the polymer water-insoluble and reduce its effectiveness as a dispersing agent. A comprehensive enumeration of suitable polyelectrolytes and numerous examples of typical preparations are set forth in U.S. Patent 2,625,529, filed February 12, 1952, by David T. Mowry and Ross M. Hedrick.

Suitable water-soluble linear polymers are the synthetic linear polymers containing water-solubilizing radicals, such as carboxyl, carboxy acid salts, hydroxyl, amide and quaternary ammonium salt radicals, appended thereto. Since the polymers will only be used in small proportions and in the use are dissolved or suspended in water, the required extent of water solubility is small.

One type of synthetic linear polymers are the polymers of acrylic derivatives of the following structural formula:

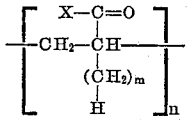

wherein X is a solubilizing radical of the group consisting of —OK, —ONa, —ONH$_4$, —ONRH$_3$, —OHR$_2$H$_2$, —OHR$_3$H, —ONR$_4$, —OH, —NH$_2$, —OCH$_2$NR$_2$, —OCH$_2$CH$_2$NR$_2$, —NHR and —NR$_2$, R is an alkyl radical having up to four carbon atoms, $m$ is a small whole number from zero (0) to one (1), inclusive, and $n$ is a whole number indicative of the extent of polymerization. In addition the water-soluble copolymers of the same acrylic and methacrylic acid derivatives and other copolymerizable monomers such as styrene, vinyl acetate, acrylonitrile, methacrylonitrile, butadiene, the alkyl acrylates, the alkyl methacrylates, vinylidene chloride, vinyl chloride, the alkyl maleates, the alkyl fumarates, α-methylstyrene, and other olefinic compounds capable of polymerization with the acrylic and methacrylic acid derivatives described.

Another class of compounds useful in the practice of this invention are those represented by the structural formula:

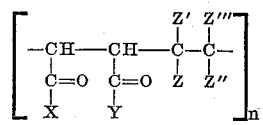

wherein X and Y may be the same or different radicals of the group consisting of —OK, —ONa, —O(½Ca), —ONH$_4$, —ONRH$_3$, —ONR$_2$H$_2$, —ONR$_3$H, —ONR$_4$, —OH, —NH$_2$, —OCH$_2$—N—R$_2$, —OCH$_2$—CH$_2$—NR$_2$, —OR, —N—C$_2$H$_4$—NR$_2$, —NHR and —NR$_2$, not more than one of X and Y being —OR, and wherein Z, Z', Z", and Z''' are radicals of the group consisting of —OCOCH$_3$, —OCOH, —OH, —Cl, —CH$_3$, —COOH, —C$_6$H$_5$, —H, —OR, and —COOR, a plurality of Z, Z', Z" and Z''' being hydrogen, and not more than one of the Z, Z', Z" and Z''' being of the group —OCOCH$_3$, —OH, —C$_6$H$_5$, —OCOH, —OR, —COOR and —COOH, and all of the radicals of the group Cl and CH$_3$ being attached to the same carbon atom, R in the above formula representing an aliphatic hydrocarbon radical containing from one to four carbon atoms.

Suitable maleic acid copolymers useful in the practice of this invention are the copolymers of maleic acid, maleic anhydride, maleamic acid, maleic amide, the alkali and alkaline earth metal and ammonium maleic acid salts, the di(β-aminoethyl) maleate, di(methylaminoethyl) maleate, di(N,N-dimethyl β-aminoethyl) maleate, and the various salts, amides and aminoalkyl esters of the alkyl half esters of maleic acid, and other olefinic monomers polymerizable therewith. Of especial value are the copolymers of maleic derivatives in which the alkyl radicals have up to four carbon atoms. Similar copolymers of derivatives of chloromaleic and citraconic acids may also be used.

Other compounds useful in the practice of this invention are the polymers of acrylic and methacrylic acid derivatives, including acrylic acid, methacrylic acid, acrylamide, methacrylamide, the alkali metal, amine and ammonium salts of either acrylic or methacrylic acid, β-aminoethyl acrylate, β-aminoethyl methacrylate, β-methyl aminoethyl acrylate, β-methyl aminoethyl methacrylate, N,N-dimethyl β-aminoethyl methacrylate, and the N-alkyl substituted acrylamides and methacrylamides.

Still other useful water-soluble synthetic polymers are the polymers of sulfonated polystyrene, polyvinyl alcohol, polyvinyl pyridine and other olefinic polymers containing carboxyl, hydroxyl, carboxyl salt, and quarternary ammonium salt radicals. Copolymers containing the solubilizing groups are also useful, which copolymers may be prepared by copolymerizing the monomers containing the said groups, or by preparing the olefinic copolymers and introducing the solubilizing groups by hydrolysis, alkylation or sulfonation.

Very effective water-soluble polymers may be prepared by the hydrolysis of polymers of esters, such as polyvinyl acetate, or other polyvinyl esters methyl acrylate, or other alkyl acrylates, methyl methacrylate, or other alkyl methacrylates, and acrylonitrile. Similarly copolymers of two or more of hydrolyzable monomers and other monomers, such as styrene, vinyl chloride, vinylidene chloride, β-methylstyrene, isopropenylbiphenyl, and vinylbiphenyl may be hydrolyzed to form useful water-soluble linear polymers.

In the selection of water-soluble linear polymers for the practice of this invention some consideration should be given to molecular weight. It has been found desirable to use polymers with molecular weights of at least 10,000, and preferably greater than 15,000.

A preferred polyelectrolyte for use in the coating of particles of laminar alumina in accordance with the present invention is hydrolyzed polyacrylonitrile. The hydrolyzed polyacrylonitrile may be employed in the form of a salt or as polyacrylic acid obtained as the ultimate product of hydrolysis, and while preferably utilized in a water soluble form, may also be employed as a water dispersible type. The hydrolyzed polyacrylonitrile may be obtained by the acid or alkali catalyzed hydrolysis of polyacrylonitrile as described in U.S. Patents 2,675,529 and 2,727,835. The polyacrylonitrile may be either a high or low molecular weight type, and the hydrolyzed product may have a wide range of viscosity.

The particles of laminar alumina are coated by suspending the same in a solution or slurry of the hydrolyzed polyacrylonitrile so that the individual particles are completely coated with the solution. In order to aid in wetting of the particles with the solution suitable wetting agents may be present in the solution or dispersion.

The concentration of the polyelectrolyte such as hydrolyzed polyacrylonitrile in the solution should be such as to deposit from 3% to 25%, or preferably from 5% to 15% by weight of the hydrolyzed polyacrylonitrile relative to the weight of the modified alumina. After coating with the water solutions, the particles are removed, allowed to drain and then dried by any suitable means. If a dry milling method is desired, the dry polyelectrolyte and the laminar alumina may be ground together for eventual slurrying in water. However, if it is desired to market the coated particles in a water slurry, for example in the preparation of water paints, the composition may be prepared in such a slurry form.

The alumina particles which have been coated and dried as above may readily be resuspended in an aqueous suspending medium. The suspension may be made directly into water or into aqueous solutions or suspensions containing other pigments or suspending agents. The suspension so prepared may be applied directly as a coating composition upon normally combustible surfaces or structures. Application may be made by brushing, spraying or dipping in the usual manner. The suspension may be adjusted to the proper consistency depending upon the mode of application to be employed.

The present products are particularly useful for the protection of surfaces against sparks or heated metal particles which are generated during welding or cutting operations, and which are often a source of fire when these operations are carried out adjacent to combustible materials. The coating compositions herein provided are readily redispersible in water, and accordingly may be quickly removed, once their purpose has been served.

The following examples illustrate specific embodiments of the present invention:

*Example 1*

An aqueous dispersion was prepared utilizing 100 g. of water containing 10 g. of laminar alumina prepared in accordance with the process described in co-pending patent application, Serial No. 631,444, filed December 31, 1956. The particles had an average thickness of about 0.02 micron and the greatest dimension of the irregularly shaped particles was about 15 microns. The dispersion of alumina and water also contained 1 g. of hydrolyzed polyacrylonitrile. The three components were mixed in a high speed blender, after which films were dispersed upon wooden panels to give a dry film thickness of about 0.003 inch. It was found that the coated panels were resistant to ignition by a flame, so that the coated panels were greatly improved in fire retardancy. It was also found that sodium silicate, e.g., as a 1 weight percent addition, is a desirable additive to aqueous dispersions of the combination of alumina and hydrolyzed polyacrylonitrile to further improve the abrasion resistance of the coating.

*Example 2*

The coated laminar alumina particles in suspension as described in Example 1 were utilized as a surface coating on iron panels which were to be welded. It was found that the alumnia coating reduced the adhesion of spatter particles from the welding operation so that the iron particles were readily cleaned by a simple wire brushing operation without the necessity of grinding or filing in order to remove spatter particles of the welding metal.

*Example 3*

In order to compare the film character of the present coated particles of laminar alumina, with another comparable oxide, the slurry of Example 1 was used to form films prepared on microscope slides. The films were applied as uniform coatings with an instrument such as is utilized in the paint industry for the application of uniform test films. The thicknes of the film at the time of application was 0.0030 inch. It was found that the film thickness after drying was about 0.0020 inch, indicating a retention of 66% of the original thickness. The film coatings were found to be incombustible and to be of utility in protecting a base material such as wood or paper against combustion by a flame.

*Example 4*

Films were prepared utilizing zinc oxide of a comparable particle size with the alumnia of Example 1 and with the same concentrations in aqueous suspension. Films were also prepared on glass utilizing a film thickness of 0.0030 inch. However, it was found that when these films were dried the final film thickness was 0.0005 inch, indicating less bulkiness and film thickness than could be obtained from the alumina, i.e., retention of 16% of original thickness.

It has also been found that the present combinations of alumina particles coated with hydrolyzed polyacrylonitrile may readily be formed into lakes which are of unusual utility as pigmenting materials in the formulation of coating compositions.

*Example 5*

A red lake was prepared by slurrying 10 g. of a laminar form of alumina having an average particle diameter of about 16 microns in 100 g. of water, together with 0.5 g. of hydrolyzed polyacrylonitrile used as the polyacrylic acid resulting from complete hydrolysis. The alumina and the polyacrylic acid were slurried in the water by utilizing a high speed blender, after which 2/10 g. of a red dye, Chrome-Red Cloth (C.I. 262) was then added while stirring to obtain a brilliant red lake which maintained its red color despite extreme dilution. This lake was then dried and was ground with linseed oil to obtain a red pigment for paint.

*Example 6*

It was found that the red pigment as prepared above in Example 5 could be ground with linseed oil to give a paste which was readily incorporated with a paint base to give a strongly colored red paint having the following composition.

|  | Parts |
|---|---|
| Titanium dioxide | 70 |
| Zinc oxide | 290 |
| Manganese silicate | 400 |
| Red lake on aluminum oxide particles coated with polyacrylic acid | 25 |
| Linseed oil, alkali refined | 430 |
| Linseed oil, heat bodied | 45 |
| Thinner | 90 |
| Lead naphthenate | 11 |
| Cobalt naphthenate | 1.5 |

*Example 7*

An aqueous dispersion was prepared utilizing 100 grams of water containing 10 grams of laminar alumina and 1 gram of a copolymer of vinyl acetate and maleic acid utilized as the ammonium salt. The three components were mixed in a high speed blender, after which films of the slurry were applied to wood panels. It was found that the dried coating served as a flameproof coating which protected the wood against ignition by a flame.

The present coatings of alumina particles coated with a polyelectrolyte are also of utility in various decorative effects, such as in the coating of Christmas trees to provide a white tree. Other uses for such dense white coatings are in the whitening of concrete walls and floors and in the preparation of advertising displays and in show card colors. An additional advantage of such coatings based upon the present alumina particles coated with hydrolyzed polyacrylonitrile is that a surface is provided which can readily be written upon, such as by the use of pencil, crayons, and ink. The coatings are furthermore non-chalky and extremely durable in indoor use such as in making floor markings in a gymnasium or playroom. At the same time the coatings have the advantage of being easily washed off by water when it is desired to remove them.

What is claimed is:

1. A laminar alumina having particles 0.005 to 0.10 micron average thickness and 1 to 10 microns average length and width and having dispersed on the surface thereof from about 3% to about 25% by weight relative to the weight of the alumina of polymeric polyelectrolyte which contains substantially linear continuous carbon chains prepared by the polymerization of an ethylenically unsaturated monomer and having a weight average molecular weight greater than 15,000.

2. A laminar alumina having particles 0.005 to 0.10 micron average thickness and 1 to 10 microns average length and width and having dispersed on the surface thereof from about 3% to about 25% by weight relative to the weight of the alumina of a polymeric polyelectrolyte which contains substantially linear continuous carbon chains prepared by the polymerization of an ethylenically unsaturated monomer, and having a weight average molecular weight of at least 10,000.

3. A laminar alumina having particles 0.005 to 0.10 micron average thickness and 1 to 10 microns average length and width and having dispersed on the surface thereof from about 3% to about 25% by weight relative to the weight of the alumina of hydrolyzed polyacrylonitrile having a weight average molecular weight of at least 10,000.

4. A laminar alumina having particles 0.005 to 0.10 micron average thickness and 1 to 10 microns average length and width and having dispersed on the surface thereof is about 3% to about 25% by weight relative to the weight of the alumina of a copolymer of vinyl acetate and maleic acids in the form of ammonium salts of the said copolymer having a weight average molecular weight of at least 10,000.

5. An aqueous dispersion of laminar alumina having particles 0.005 to 0.10 micron average thickness and 1 to 10 microns average length and width the said particles being coated with hydrolyzed polyacrylonitrile of at least 10,000 weight average molecular weight, the proportion of the said hydrolyzed polyacrylonitrile being from 5% to 15% by weight relative to the weight of the said alumina.

6. An aqueous dispersion of laminar alumina having particles 0.005 to 0.10 micron average thickness and 1 to 10 microns average length and width the said particles being coated with hydrolyzed polyacrylonitrile of at least 10,000 weight average molecular weight, the proportion of the said hydrolyzed polyacrylonitrile being from 3% to 25% by weight relative to the weight of the said alumina, the proportion of the alumina being from 2% to 30% by weight.

7. An aqueous dispersion of laminar alumina having particles 0.005 to 0.10 micron average thickness and 1 to 10 microns average length and width the said particles being coated with hydrolyzed polyacrylonitrile of at least 10,000 weight average molecular weight, the proportion of the said hydrolyzed polyacrylonitrile being from 5% to 15% by weight relative to the weight of the said alumina, and the proportion of the alumina being from 2% to 30% by weight of the total composition.

8. A lake composition comprising an organic dye adsorbed upon particles of laminar alumina having particles 0.005 to 0.10 micron average thickness and 1 to 10 microns average length and width, the said particles of alumina being coated with hydrolyzed polyacrylonitrile of at least 10,000 weight average molecular weight.

9. A lake composition comprising an organic dye adsorbed upon particles of laminar alumina having particles 0.005 to 0.10 micron average thickness and 1 to 10 microns average length and width, the said particles of alumina being coated with hydrolyzed polyacrylonitrile of at least 10,000 weight average molecular weight, the proportion of the said hydrolyzed polyacrylonitrile being from 3% to 25% by weight relative to the weight of the said alumina.

10. A lake composition comprising an organic dye adsorbed upon particles of laminar alumina having particles 0.005 to 0.10 micron average thickness and 1 to 10 microns average length and width, the said particles of alumina being coated with hydrolyzed polyacrylonitrile of at least 10,000 weight average molecular weight, the proportion of the said hydrolyzed polyacrylonitrile being from 5% to 15% by weight relative to the weight of the said alumina.

11. A coating composition comprising a liquid vehicle containing dispersed therein particles of laminar alumina having particles 0.005 to 0.10 micron average thickness and 1 to 10 microns average length and width, the said particles of alumina being coated with hydrolyzed polyacrylonitrile of at least 10,000 weight average molecular weight in the proportion of from 3% to 25% by weight of the hydrolyzed polyacrylonitrile relative to the weight of the said alumina.

12. A coating composition comprising a liquid, organic vehicle containing dispersed therein particles of laminar alumina having particles 0.005 to 0.10 micron average thickness and 1 to 10 microns average length and width, the said particles of alumina being coated with hydrolyzed polyacrylonitrile of at least 10,000 weight average molecular weight in the proportion of from 3% to 25% by weight of the hydrolyzed polyacrylonitrile relative to the weight of the said alumina.

References Cited in the file of this patent

UNITED STATES PATENTS

| | | |
|---|---|---|
| 1,816,388 | Mittasch | July 28, 1931 |
| 1,843,634 | Straub | Feb. 2, 1932 |
| 1,976,679 | Fikentscher | Oct. 9, 1934 |
| 2,490,677 | Cupery | Dec. 6, 1949 |
| 2,543,801 | Derby | Mar. 6, 1951 |
| 2,649,439 | Brown | Aug. 18, 1953 |
| 2,726,230 | Carlson | Dec. 6, 1955 |

FOREIGN PATENTS

| | | |
|---|---|---|
| 541,647 | Canada | May 28, 1957 |